United States Patent
Strandberg

(10) Patent No.: US 8,602,509 B2
(45) Date of Patent: Dec. 10, 2013

(54) BRAKE PROTECTION DEVICE, BRAKE ARRANGEMENT AND METHOD FOR CONTROLLING A BRAKE TEMPERATURE

(75) Inventor: Jonny Strandberg, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 730 days.

(21) Appl. No.: 11/421,676

(22) Filed: Jun. 1, 2006

(65) Prior Publication Data

US 2006/0207842 A1      Sep. 21, 2006

Related U.S. Application Data

(63) Continuation of application No. PCT/SE2004/001718, filed on Nov. 24, 2004.

(30) Foreign Application Priority Data

Dec. 8, 2003    (SE) ..................................... 0303342

(51) Int. Cl.
    *B60T 8/32*    (2006.01)
(52) U.S. Cl.
    USPC ..... 303/191; 303/167; 188/264 R; 188/264 D
(58) Field of Classification Search
    USPC .......... 188/264 D, 264 R; 303/191, 192, 152, 303/167, 151
    See application file for complete search history.

(56) References Cited

U.S. PATENT DOCUMENTS

| | | | | |
|---|---|---|---|---|
| 4,477,124 A | * | 10/1984 | Watanabe | 303/191 |
| 5,050,939 A | * | 9/1991 | Middelhoven et al. | 303/71 |
| 5,174,420 A | * | 12/1992 | DeWald et al. | 188/264 E |
| 6,030,314 A | | 2/2000 | Brooks et al. | |
| 6,502,674 B2 | * | 1/2003 | Rheinheimer et al. | 188/251 M |
| 7,434,893 B2 | * | 10/2008 | Sabelstrom et al. | 303/3 |
| 2005/0052075 A1 | * | 3/2005 | Sabelstrom et al. | 303/3 |

FOREIGN PATENT DOCUMENTS

| | | |
|---|---|---|
| EP | 0873925 A2 | 10/1998 |
| EP | 0873926 A2 | 10/1998 |
| GB | 2211568 A | 7/1989 |
| SE | 507807 C2 | 7/1998 |
| SE | 522431 C2 | 2/2004 |

OTHER PUBLICATIONS

International Search Report from corresponding International Application No. PCT/SE2004/001718.
International Preliminary Examination Report from corresponding International Application No. PCT/SE2004/001718.

* cited by examiner

*Primary Examiner* — Thomas Irvin
(74) *Attorney, Agent, or Firm* — WRB-IP LLP

(57) ABSTRACT

A protection device for a brake which is cooled by a coolant in a vehicle, the brake having a first active state in which a brake pressure is established in the brake for braking of the vehicle. The device comprises a sensor for measuring the temperature of the coolant of the brake, and a control arrangement interacting with the temperature sensor and the brake in order to reduce or remove the brake pressure of the brake in the first active state in the event of a temperature of the coolant in excess of a predefined value.

23 Claims, 3 Drawing Sheets

BRAKE PROTECTION DEVICE, BRAKE ARRANGEMENT AND METHOD FOR CONTROLLING A BRAKE TEMPERATURE

The present application is a continuation of International Application No. PCT/SE2004/001718, filed Nov. 24, 2004, which claims priority to SE 0303342-0, filed Dec. 8, 2003, both of which are incorporated by reference.

BACKGROUND AND SUMMARY

The present invention relates to a protection device according to the preamble of claim 1 below, a brake arrangement according to the preamble of claim 2 below, and a vehicle provided with such a device or brake arrangement, and a method for controlling the temperature of a brake according to the preamble of claim 13 below.

Various types of plant vehicles, such as frame-steered vehicles referred to as dumper vehicles, are conventionally provided with two different brake systems. One of the brake systems is referred to as the service brake, by means of which the vehicle can be braked, as necessary, in order to reduce the speed of the vehicle and/or to bring the vehicle to a standstill. The service brake, which may be a disk brake, is designed to be capable of delivering different braking effects within a given range depending on the load. In addition to the service brake, a further brake system, a so-called retarder, may be used in order to brake the vehicle on downgrades.

The retarder, which functions as a basic brake so that the vehicle does not reach an uncontrolled speed when the vehicle is being driven down inclines, especially long downgrades, is capable of absorbing relatively large amounts of energy for a relatively low braking effect (low braking effect over a long period of time).

Hitherto known retarders are based, for example, on the principle of restricting a flow. For example, the flow of exhaust gas in a diesel engine may be restricted in order to produce a pressure drop leading to the desired braking effect. Another way of producing a retarder is to provide some part of the transmission system with a bladed impeller, which rotates with this part, said bladed impeller being braked in that as it rotates it is compelled to displace oil.

More recently, however, another type of brake has been developed which uses the aforementioned service brake for both of the braking functions, that is to say one and the same brake system is used both for conventional braking and for retarder braking. One problem with the new use of the conventional service brakes as retarder is that they are at risk of becoming far too hot in retarder braking, or in retarder braking followed by subsequent conventional braking.

The U.S. Pat. No. 6,030,314 describes a method for braking a vehicle. According to the method the speed of a vehicle is controlled on the basis of the temperature of the brake coolant in such a way that when a temperature in excess of a predefined temperature range is registered, the brake force in retarder braking is increased in order to reduce the basic speed of the vehicle. The basic speed is further reduced until the temperature drops to such a degree that it lies within the desired temperature range. It is asserted here that increasing the brake force reduces the speed of the vehicle and hence also the amount of heat that has to be removed from the brake disks, so that the temperature of the coolant will therefore also be reduced. There are probably situations, however, in which such a method is unsuitable, and there is a risk of the brake overheating, which means that the required braking effect cannot be achieved or that the brake will be damaged, which in the long run constitutes a safety risk.

It is desirable to provide a protection device and a brake arrangement of the type described in the introductory part, which under certain, given conditions are capable of ensuring that a brake does not reach a temperature in excess of a given level, in order thereby to safeguard the working of the brake.

According to an aspect of the invention, a brake arrangement comprises a brake which is cooled by a coolant and is intended for a vehicle, the brake having a first active state in which a brake pressure is established in the brake for braking of the vehicle, a sensor for measuring the temperature of the coolant of the brake, and a control arrangement interacting with the temperature sensor and the brake in order to reduce the brake pressure of the brake in the first active state if a temperature of the coolant is in excess of a predefined value. The brake has a second active state for braking of the vehicle, in which second state the brake pressure of the brake is independent of the brake pressure reducing control arrangement, and the brake in the second active state is designed to provide a service brake function of the vehicle.

By providing the protection device/the brake arrangement with a sensor for measuring the temperature of the brake coolant, and a means interacting with the temperature sensor and the brake in order to reduce or remove the brake pressure of the brake in said first active state in the event of a temperature of said coolant in excess of a predefined value, it can be ensured that the brake is used in such a way that it is not overloaded and does not reach an undesirably high temperature.

It is desirable to provide a method of the type described in the introductory part, which under certain, given conditions is capable of ensuring that a brake does not reach a temperature in excess of a given level, in order thereby to safeguard the working of the brake.

According to another aspect of the invention, a method for controlling the temperature of a brake cooled by a coolant and arranged in a vehicle comprises operating the brake in a first active state, comprising establishing a first active state brake pressure in the brake for braking of the vehicle, measuring a temperature of the coolant of the brake, and reducing the first active state brake pressure of the brake if a temperature of the coolant is in excess of a predefined value. The method further comprises operating the brake in a second active state, comprising establishing a second active state brake pressure, the second active state brake pressure being independent of the first active state brake pressure reducing function in the first state, and wherein, in the first active state, the brake is used for braking the vehicle and, in the second active state, the brake is used for a service brake function of the vehicle.

A method according to an aspect of the invention provides a brake function which is protected against thermal overload, the method being especially suited to use in retarder braking of a vehicle which has a brake system that combines both a retarder function and a service brake function.

Aspects of the invention also relate to a vehicle provided with a protection device or brake arrangement according to the invention.

BRIEF DESCRIPTION OF THE DRAWINGS

There follows a more detailed description of exemplary embodiments of the invention, which makes reference to drawings attached. In the drawings.

DETAILED DESCRIPTION

Figure 1:
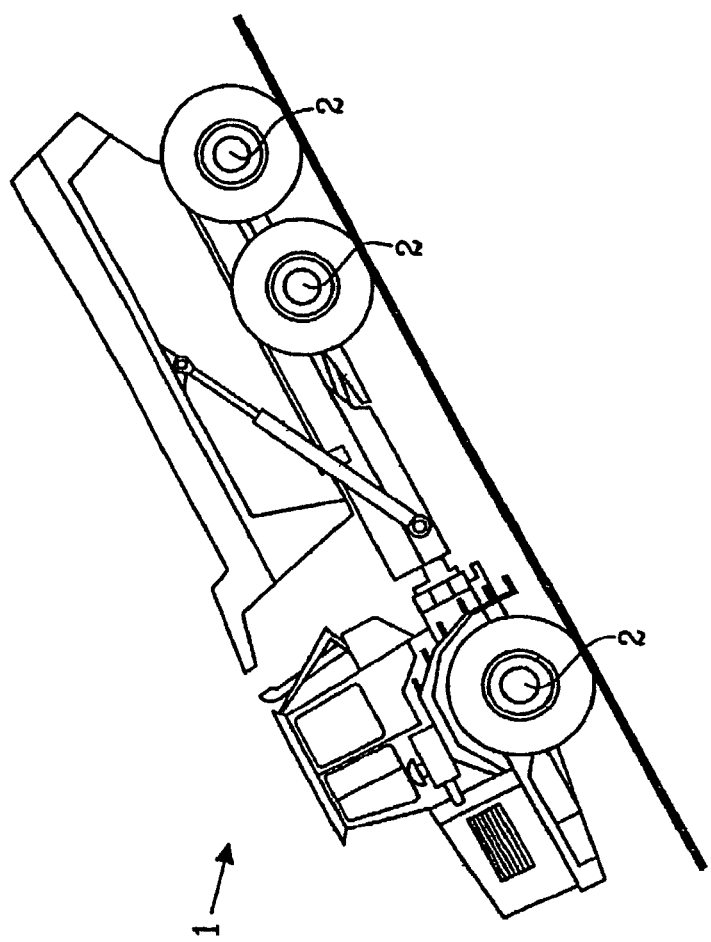
FIG. 1 is a side view of a work vehicle to which the device according to the invention and the method according to the invention can be advantageously applied.

FIG. 1 shows a work vehicle 1 of the type referred to as a frame-steered vehicle, to which the invention can be advantageously applied. One or more brake arrangements may be arranged on one or more wheels (wheel axles) 2 of the vehicle 1.

It must be emphasized that although the invention is described in connection with a dumper vehicle, the invention may also be applied to any vehicle having a brake which is cooled by an arranged flow of a coolant that absorbs and conducts heat away from the brake. This relates primarily to so-called "wet brakes", which are friction-based and are cooled by a coolant, such as oil, so that the brake does not reach an excessively high temperature. Disk brakes having one or more disks are often used, which for their braking effect rely on friction between a rotating part and a non-rotating part which is applied against the rotating part. The function of said coolant is to remove the heat generated by the friction, which would otherwise be transmitted to the brake components.

Figure 2:
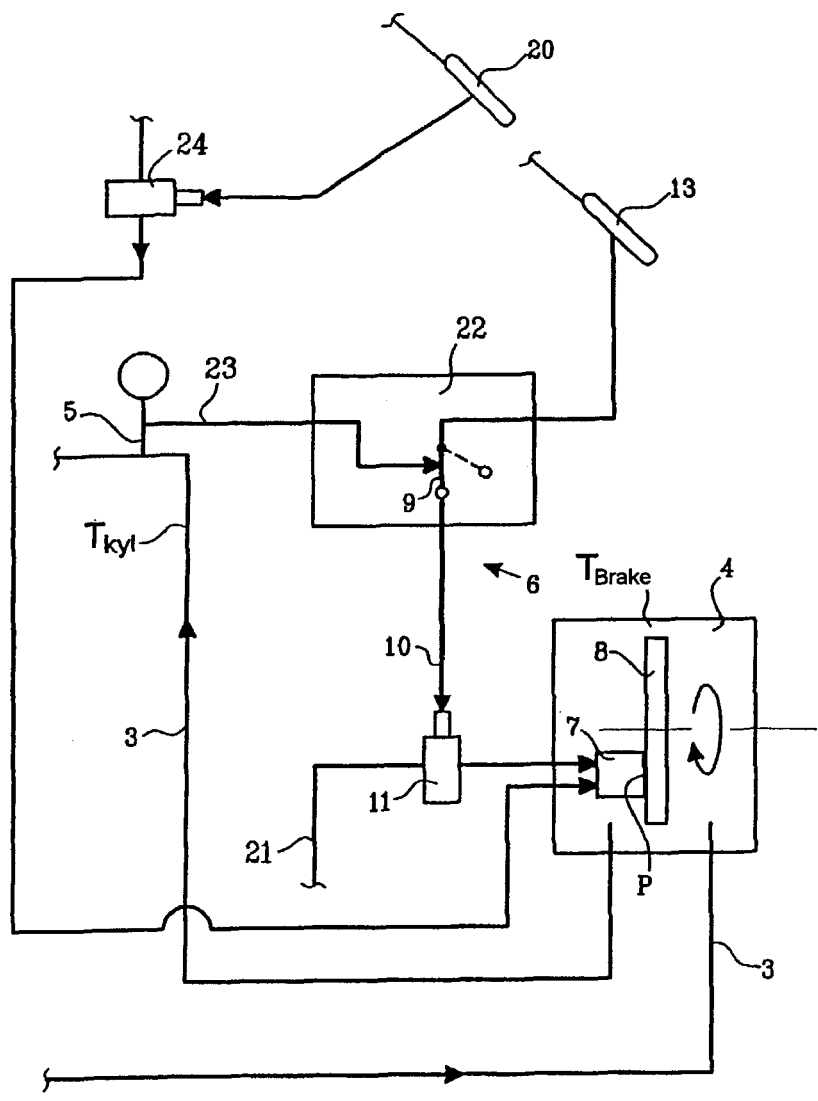
FIG. 2 is a schematic illustration of the device according to the invention and a brake.

The device/the brake arrangement according to the invention for controlling a vehicle brake cooled by a coolant 3 are represented schematically in FIG. 2. For application of the invention in a retarder, the brake 4 appropriately has a first active state in which a brake pressure P is established in the brake 4 for retarder braking of the vehicle The term retarder braking will hereinafter be used with the meaning described in the introductory part, that is to say a braking which is performed on a downgrade and which in relation to conventional service braking is an inherent, separate function of the brake 4. The device/the brake arrangement according to the invention comprises a sensor 5 for measuring the temperature of the coolant 3 of the brake 4, and a means 6 interacting with the temperature sensor and the brake in order to reduce or remove the brake pressure P of the brake 4 in said first active state in the event of a temperature of said coolant in excess of a predefined value.

The term brake pressure P here relates to the applied pressure of the brake. The applied pressure is the pressure by means of which a brake piston 7, for example, is pressed against a rotating brake disk 8 in order to produce a braking effect. Should the brake comprise a set of multiple interacting disks (some of which are rotor disks and some stator disks), the brake pressure or the applied pressure is the pressure by means of which the disks are pressed against one another in order to produce the braking effect.

The brake pressure reducing means 6 may be an integral control equipment, or may form part of another control unit for functions of the brake (the vehicle), which is based on electrical and/or mechanical feedback and control components known in the art and associated software. One or more of the brake functions is preferably controlled by means of a computer-based control unit 22. A computer program which can be loaded directly into the internal memory of a computer and which comprises data code or software code sections for instructing a processor, may be used in order to take charge of the brake functions and/or to perform the steps defined in the method according to the invention when the program is run on a computer. See also the following description with reference to FIG. 3, which describes an example of a set of steps in the method according to the invention. The computer program might be at least partially provided over a network, such as the Internet. The control unit 22 may be designed to receive a computer-readable medium having a computer program stored thereon and intended to bring a computer to control the steps which are defined by the method according to the invention.

In its simplest form the brake pressure reducing means 6 may comprise a relay 9, which is controlled by the temperature sensor 5, and a valve 11 that can be actuated with said relay. In the event of a temperature of said coolant 3 in excess of the predefined temperature, the sensor 5 sends a signal 23 to said relay 9 (so that the retarder function is no longer available, which corresponds to said relay being situated in the position shown by dashed lines), which by means of a signal 10 actuates the valve 11, which in turn acts upon the hydraulic oil pressure of the brake 4 (the hydraulic oil pressure giving rise to the brake pressure P between the brake piston and the associated brake disk, or equivalent components) in such a way that the hydraulic oil pressure and hence the brake pressure P are reduced/removed.

The fact that the brake pressure reducing means 6 is capable of reducing or removing the brake pressure P if the temperature of said coolant 3, hereinafter referred to as cooling oil, exceeds a certain, predefined temperature means that the temperature of the brake 4 can be controlled and the brake can be protected against overheating. If the temperature is lower than the maximum permitted value, the brake 4 suitably functions according to given instructions from the control unit 22 and the brake pressure reducing means 6 does not exert an action at all on the brake pressure.

In order to be able to engage the first active state, that is to say the retarder function, the brake 4 may be provided with a control device 13, preferably in the form of a pedal 13, which may be arranged in a position in the vehicle 1 corresponding to the position of the driver's feet and suitably to the left of a second pedal 20 intended for a service brake function of the brake 4. In the embodiment illustrated the pedal 13 is supposed, by means of the valve 11 and via the necessary control equipment, to control the hydraulic oil pressure of the hydraulic oil flow entering the brake 4, see the preferably analog signal 10 and hydraulic line 21 illustrated in schematic form in FIG. 2. This means therefore that, in the position of said relay 9 shown, the pedal 13 and the retarder function are engaged (and the brake pressure reducing function is deactivated).

There is scope for designing the retarder function so that different degrees of (basic) braking can be set by means of the control device 13. The driver can thereby himself select different brake pressures by placing the retarder pedal 13 in various positions. The control device 13 may have one or more fixed positions with different brake pressure levels or a continuously variable adjustment of the brake pressure within a given range. Different brake pressure levels together with the brake pressure reducing means 6 mean that a high degree of utilization of the brake 4 can be achieved whilst providing an overload protection, which ensures that the temperature limit is not exceeded, that is to say relatively high brake torque for shorter periods of time and relatively low brake torque for longer periods of time will not lead to activation of the brake reducing function. In order to further optimize the use of the brake in said first active state, said selectable brake pressures can be adjusted according to the current speed of the vehicle 1. The selectable brake pressures may be adjusted according to the current speed of the vehicle 1, so that the brake pressures P diminish with increased vehicle speed and increase with reduced vehicle speed, in order to optimize the usability of the brake 4 in the first active state. The brake pressure can furthermore be adjusted to the speed of the vehicle so that the braking energy (the braking effect multiplied by the braking time) will be less than a predefined value, this value being selected so that said predefined temperature value is not exceeded in instantaneous braking, that is to say braking for relatively short periods of time, or braking for relatively long periods of time with low braking effect. (The temperature of the brake is directly related to the braking energy.)

If the cooling oil temperature is nevertheless exceeded, the brake pressure reducing means 6 will ensure that the brake pressure P is reduced or largely removed, so that the temperature falls to a permitted value before the brake pressure P can be increased again.

The brake 4 preferably also has a second active state for braking of the vehicle 1, in which second active state a brake pressure P of the brake 4 can be achieved independently of the brake pressure reducing means 6. Said brake pressure reducing means 6 consequently has no effect on the brake pressure whilst the brake is in the second active state, which means that the brake 4 can be loaded to the extent desired, for example the maximum extent with maximum braking effect and for any period of time, without taking account of the temperature of the brake. In this second active state the brake 4 functions as a conventional service brake. In FIG. 2 the service brake function is illustrated by means of the pedal 20 and a valve 24 for supplying hydraulic oil in order to achieve the brake pressure P of the brake 4.

In a second variant of the invention the retarder function might be arranged in the service brake pedal rather than a separate control device. In such a case, for example, a first position of the service brake pedal might mean that the retarder function is activated, and a second more depressed position that the service brake function is activated. Although a control device in the form of pedals has primarily been described, other controls such as knobs, levers etc. can obviously be used instead of pedals without departing from the scope of the invention.

The device according to the invention and the method according to the invention for controlling the temperature of a vehicle brake cooled by means of a coolant functions as follows:

The method is applied to a brake 4, which has a first active state in which a brake pressure P is established in the brake 4 for braking of the vehicle 1. In the first active state 12 the temperature of the coolant 3 of the brake 4 is measured, the temperature preferably being measured continuously by a temperature sensor 5, for example, and the brake pressure P of the brake 4 is reduced or removed if a temperature of said coolant 3 in excess of a first predefined value is registered. The brake pressure reducing means 6 automatically reduces the brake pressure P when the temperature sensor 5 registers such a temperature. After engagement of the brake pressure reducing means 6 (isolation of said relay 9) the brake 4 will cool, and on registering a cooling oil temperature below a second predefined value (which is equal to or preferably lower than said first temperature value) the brake pressure reducing means 6 is disengaged (activation of said relay 9) in order to permit retarder braking again.

In the first active state the brake pressure can be varied as a function of the speed of the vehicle 1, so that the brake pressure P diminishes with increased vehicle speed and increases with reduced vehicle speed, in order to optimize the usability of the brake 4 in the first active state. The brake pressure P is preferably controlled as a function of the speed of the vehicle, so that the braking energy (the braking effect multiplied by the braking time) will be less than a predefined value, this value being selected so that said predefined first temperature value will not be exceeded in a short braking interval with high braking effect or a longer braking interval with low braking effect. For example, the brake pressure P may be varied according to a braking effect curve based on the brake pressure and the speed of the vehicle. In a variant of the method according to the invention, the brake 4 is controlled in the first active state so that the vehicle 1 is braked by means of a largely constant braking effect, provided that the temperature of the coolant 3 of the brake 4 is lower than said first predefined temperature value. This means that in retarder braking on a downgrade the brake pressure P may be set relatively high when the vehicle has a low speed (and the wheels consequently have a low rotational speed), and relatively low when the vehicle has a high speed (and the wheels consequently have a high rotational speed).

Known physical correlations and formulae, together with the vehicle speed and the brake pressure as input parameters may be used to calculate a theoretically optimum braking effect (maximum permitted effect) by means of which the vehicle can be braked for a certain given time without a given upper brake energy value being exceeded.

The brake preferably also has a second active state, which can be activated in that said second control device 20, such as a service brake pedal, is actuated, and which means that a function of the brake which is independent of the brake reducing function is activated in order to provide the requisite brake pressure P. The brake 4 therefore has a second active state for braking of the vehicle 1, in which second active state a brake pressure P, which is independent of the brake pressure reducing function in the first state, is established in the brake 4, and the applied pressure of the brake 4 can be freely varied, uninfluenced by any temperature limit. The first predefined temperature value, which is compared with the temperature of the cooling oil 3 in the first active state, is suitably selected so that on registering a temperature in excess of said first predefined temperature value (which leads to reduction or removal of the brake pressure in the first active state of the brake), the brake 4 has a temperature which still allows the braking action needed to bring the vehicle to a standstill to be achieved via the service brake 20 in said second active state, if so required.

Note, however, that the function of the brake pressure reducing means 6 is not to control the speed of the vehicle 1 but merely to protect the brake 4 against overheating. This means that on registering an excessively high temperature of the cooling oil 3, and therefore of the brake, the brake pressure reducing means 6 will reduce or remove the brake pressure P, which in turn means that the vehicle 1 accelerates down the incline, at least until the temperature has again fallen to an acceptable level, or until the driver activates the second active state of the brake 4, that is to say the service brake function, by depressing the service brake pedal 20.

Figure 3:
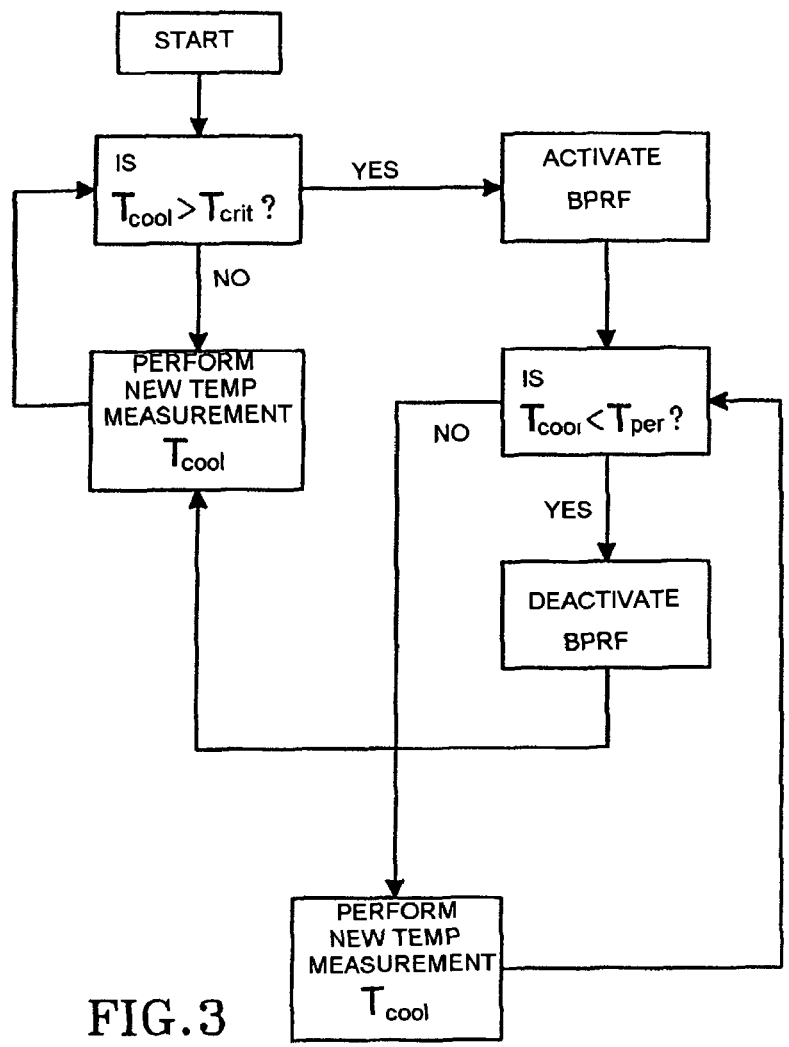
FIG. 3 is a flow chart for an embodiment of the method according to the invention.

FIG. 3 shows a flow chart for one embodiment of the method according to the invention. The temperature of said coolant is measured continuously and is compared with said first predefined value which represents the critical temperature, which should not be exceeded. $T_{crit}$ is selected on the basis of the maximum permitted temperature of the brake, $T_{brake}$. If $T_{cool}$ is less than or equal to after a certain selected period of time a new temperature measurement of is performed for comparison with loop continues while ever the condition fulfilled. If is greater than $T_{crit}$ the brake pressure reduction function (BPRF) is activated by the brake pressure reducing means 6 and depending on the design of this function the brake pressure is either reduced or entirely removed, with the aim of reducing $T_{cool}$. Once the BPRF has been activated, after a certain selected period of time a new temperature measurement of is performed, this temperature being compared with a second predefined value, $T_{per}$, which represents the permitted temperature at which the brake pressure can be increased or established again. If cool is greater than or equal to $T_{per}$, after a certain selected period of time a new temperature measurement of is performed for comparison with $T_{per}$. This loop continues while ever the condition $T_{cool} \geq T_{per}$ is fulfilled. If $T_{cool}$ is less than $T_{per}$, BPRF is deactivated and the temperature measurement of for comparison of Tand continues.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is emphasized that the invention is not limited to the exemplary embodiments described, and from a description of the idea of the invention a number of variants and modifications of the invention will be obvious to the person skilled in the art, without departing from the scope of the following claims.

What is claimed is:

1. A brake arrangement comprising:
    a wheel brake which is cooled by a coolant and is intended for a vehicle, the brake having a first active state in which a brake pressure is established in the brake for braking of the vehicle for use of the wheel brake as a retarder brake;
    a sensor for measuring the temperature of the coolant of the brake; and
    a control arrangement interacting with the temperature sensor and the brake in order to only reduce the brake pressure of the brake in the first active state if a temperature of the coolant is in excess of a predefined value,
    wherein the brake has a second active state for braking of the vehicle, in which second state the brake pressure of the brake is independent of the brake pressure reducing control arrangement, and the brake pressure in the second active state being freely variable and providing a service brake function of the vehicle.

2. The brake arrangement as claimed in claim 1, wherein in the first active state two or more different brake pressures of the brake can be set through the actuation of a control device.

3. The brake arrangement as claimed in claim 2, wherein the selectable brake pressures are adjusted according to the current speed of the vehicle, so that the brake pressures diminish with increased vehicle speed and increase with reduced vehicle speed, in order to optimize the usability of the brake in the first active state.

4. The brake arrangement as claimed in claim 1, wherein in the active state different brake pressures of the brake are continuously adjustable within a given brake pressure range through the actuation of a control device.

5. The brake arrangement as claimed in claim 4, wherein the selectable brake pressures are adjusted according to the current speed of the vehicle, so that the brake pressures diminish with increased vehicle speed and increase with reduced vehicle speed, in order to optimize the usability of the brake in the first active state.

6. The brake arrangement as claimed in claim 1, wherein in the first active state the brake is adjustable so that the vehicle is braked by a substantially constant braking effect, provided that the temperature of the coolant of the brake is lower than the predefined temperature value.

7. The brake arrangement as claimed in claim 1. wherein the brake in the first active state is designed to provide a retarder function of the vehicle.

8. The brake arrangement as claimed in claim 1, wherein the brake is a friction-based brake.

9. The brake arrangement as claimed in claim 1, wherein the brake is a disk brake.

10. A vehicle provided with a brake arrangement as claimed in claim 1.

11. The brake arrangement as claimed in claim 1, wherein, when the wheel brake is in the first active state, the wheel brake performs a retarder brake function to prevent a vehicle the vehicle from reaching an uncontrolled speed while driving down an incline.

12. The brake arrangement as claimed in claim 1, comprising a first control device for operating the brake in the first active state for use of the brake as the retarder brake and a separate, second control device for operating the brake in the second active state for providing the service brake function.

13. A method for controlling the temperature of a wheel brake cooled by a coolant and arranged in a vehicle, comprising;
    operating the brake in a first active state, comprising
        establishing a first active state brake pressure in the brake for braking of the vehicle for use of the wheel brake as a retarder brake,
        measuring a temperature of the coolant of the brake, and
        only reducing the first active state brake pressure of the brake if a temperature of the coolant is in excess of a predefined value, and
    operating the brake in a second active state, comprising
        establishing a second active state brake pressure, the second active state brake pressure being independent of the first active state brake pressure reducing, function in the first state, and
    wherein, in the first active state, the brake is used for braking the vehicle and, in the second active state, the second active state brake pressure is freely variable and the brake is used for a service brake function of the vehicle.

14. The method as claimed in claim 13, wherein in the first active state the brake pressure is varied according to a braking effect curve based on the brake pressure and a speed of the vehicle.

15. The method as claimed in claim 13, wherein in the first active state the brake pressure is varied as a function of a speed of the vehicle, so that the brake pressure diminishes with increasing vehicle speed and increases with reduced vehicle speed, in order to optimize the usability of the brake in the first active state.

16. The method as claimed in claim 13, wherein in the first active state the brake is controlled so that the vehicle is braked by a substantially constant braking effect, provided that the temperature of the coolant of the brake is lower than the predefined temperature value.

17. The method as claimed in claim 13, wherein in the first active state the brake is used for a retarder function of the vehicle.

18. The method as claimed, in claim 13, wherein in the first active state different desired brake pressures of the brake are selected through the actuation of to control device.

19. The method as claimed in claim 13, wherein, in the first active state, the brake is used for braking the vehicle by performing a retarder brake function to prevent a vehicle the vehicle from reaching an uncontrolled speed while driving down an incline.

20. The method as claimed in claim 13, comprising operating a first control device to operating the brake in the first active state for use of the brake as the retarder brake, and operating a separate, second control device for operating the brake in the second active state for providing the service brake function.

21. A computer comprising a computer program loaded into an internal memory of the computer, the computer program comprising data code for instructing a processor when the program is run on the computer and performing a method for controlling the temperature of a Wheel brake cooled by a coolant and arranged in a vehicle, comprising;
    operating the brake in a first active state, comprising
        establishing a first active state brake pressure in the brake for braking of the vehicle for use of the wheel brake as a retarder brake,
        measuring a temperature of the coolant of the brake, and
        only reducing the first active state brake pressure of the brake if a temperature of the coolant is in excess of a predefined value, and
    operating the brake in a second active state, comprising
        establishing a second active state brake pressure, the second active state brake pressure being independent of the first active state brake pressure reducing function in the first state, and
    wherein, in the first active state, the brake is used for braking the vehicle and, in the second active state, the second active state brake pressure is freely variable and the brake is used for a service brake function of the vehicle.

22. The computer as claimed in claim 21, wherein the computer program is available, at least partially, over a network.

23. A non-transitory computer-readable medium having a computer program stored thereon for causing a computer to perform a method for controlling the temperature of a wheel brake cooled by a coolant and arranged in a vehicle, comprising;
    operating the brake in a first active state, comprising
        establishing a first active state brake pressure in the brake for braking of the vehicle for use of the wheel brake as a retarder brake,
        measuring a temperature of the coolant of the brake, and
        only reducing the first active state brake pressure of the brake if a temperature of the coolant is in excess of a predefined value, and
    operating the brake in a second active state, comprising
        establishing a second active state brake pressure the second active state brake pressure being independent of the first active state brake pressure reducing function in the first state, and
    wherein, in the first active state, the brake is used for braking the vehicle and in the second active state, the second active state brake pressure is freely variable and the brake is used for a service brake function of the vehicle.

\* \* \* \* \*